US006864202B2

(12) United States Patent
Sarkar et al.

(10) Patent No.: US 6,864,202 B2
(45) Date of Patent: Mar. 8, 2005

(54) PROCESS FOR PREPARING SODIUM SILICATE ALKALI SOLUTION DEPLETED OF SODIUM SALT AND ENRICHED IN SILICA

(75) Inventors: Biswanath Sarkar, Haryana (IN); Ram Mohan Thakur, Haryana (IN); Nagesh Samant, Haryana (IN); Mohan Kuvettu Prabhu, Haryana (IN); Ravichandran Gopal, Haryana (IN); Mitra Bhanu Patel, Haryana (IN); Sanjay Kumar Ray, Haryana (IN); Krishnan Venkatachalam, Haryana (IN); Satish Makhija, Haryana (IN); Sobhan Ghosh, Haryana (IN)

(73) Assignee: Indian Oil Corporation Limited, Haryana (IN)

( * ) Notice: Subject to any disclaimer, the term of this patent is extended or adjusted under 35 U.S.C. 154(b) by 202 days.

(21) Appl. No.: 10/282,898

(22) Filed: Oct. 29, 2002

(65) Prior Publication Data
US 2004/0053773 A1 Mar. 18, 2004

(30) Foreign Application Priority Data
Sep. 16, 2002 (IN) .................................. 828/MUM/2002

(51) Int. Cl.$^7$ ............................ B01J 29/08; B01J 29/06
(52) U.S. Cl. ............................ 502/65; 502/60; 502/64; 502/68; 502/73; 502/79; 423/332; 423/184

(58) Field of Search ................................. 423/332, 184; 502/60, 64, 65, 68, 73, 79

(56) References Cited

U.S. PATENT DOCUMENTS

| 3,898,319 | A | * | 8/1975 | Weber ......................... 423/700 |
| 4,164,551 | A | * | 8/1979 | Elliott, Jr. .................... 423/709 |
| 4,476,239 | A | * | 10/1984 | Chiang et al. ................. 502/68 |
| 4,493,902 | A | * | 1/1985 | Brown et al. .................. 502/65 |
| 4,699,893 | A | * | 10/1987 | Andrews et al. .............. 502/68 |
| 5,173,463 | A | * | 12/1992 | Macedo ........................ 502/68 |
| 5,637,287 | A | * | 6/1997 | Vaughan et al. ............. 423/702 |
| 6,114,267 | A | * | 9/2000 | Ghosh et al. ................. 502/68 |

FOREIGN PATENT DOCUMENTS

JP    6-107411    * 4/1994

* cited by examiner

*Primary Examiner*—Christina Ildebrando
(74) *Attorney, Agent, or Firm*—Nanda PBA Kumar, Esq.; Maryellen Feehery, Esq.; Reed Smith LLP

(57) ABSTRACT

The present invention relates to an improved process for obtaining sodium silicate alkali solution depleted of sodium salt and enriched in silica from a mother liquor recovered after isolation of molecular sieves and more particularly, the present invention relates to a process for recycling mother liquor obtained after the isolation of molecular sieves for the preparation of fresh molecular sieves or as a binder for producing Fluid Catalytic Cracking (FCC) catalyst.

15 Claims, No Drawings

PROCESS FOR PREPARING SODIUM SILICATE ALKALI SOLUTION DEPLETED OF SODIUM SALT AND ENRICHED IN SILICA

This application claims the right of priority under 35 U.S.C. §119(a)–(d) to Indian Patent Application No. 828/MUM/2002, filed Sep. 16, 2002.

FIELD OF THE INVENTION

The present invention relates to an improved process for obtaining sodium silicate alkali solution depleted of sodium salt and enriched in silica from a mother liquor recovered after isolation of molecular sieves. More particularly, the present invention relates to a process for recycling mother liquor obtained after the isolation of molecular sieves for the preparation of fresh molecular sieves or as a binder for producing Fluid Catalytic Cracking (FCC) catalyst.

BACKGROUND OF THE INVENTION

A number of synthetic crystalline zeolites have previously been prepared in the past. The most prominent and much exploited among them is zeolite Y. This zeolite is a synthetic analog of naturally occurring zeolite named faujasite, with respect to structure. Prior-art work on zeolite Y is related to synthesis with different types of raw materials followed by improvement in silica to alumina ratio of the framework.

U.S. Pat. No. 2,882,243 awarded to Milton and U.S. Pat. No. 3,130,007 awarded to Breck describes a process for the synthesis of Y type zeolite in which aluminum and silicon salts used are soluble in aqueous medium.

In general, crystalline molecular sieves such as zeolite A, zeolite Y, zeolite X, mordenite, ZSM series zeolites are synthesized from a reaction mixture comprising soda, alumina and silica in an aqueous media. In the process of formation of molecular sieves, only part of soda and silica are consumed, while major amount of alumina is utilized. Thus, major part of silica and soda goes unutilized in the form of the mother liquor. Improvement in the process for effective utilization or reuse of the mother liquor obtained after the synthesis of zeolite has drawn scanty attention. This mother liquor being unbalanced in composition permits only partial recycling for preparing a fresh batch of molecular sieves.

In some of the prior art processes for the manufacture of zeolite Y and X, partially acidic aluminum sulfate as a aluminum source is used. During the preparation of precursor gel, sodium sulfate byproduct is formed by the reaction between sodium hydroxide and soda of silicates with aluminum sulfate. This sodium sulphate byproduct remains in the mother liquor even after recovery of crystallized molecular sieves and act as a hurdle, and disallows even partial recycling of mother liquor for preparing a fresh batch of molecular sieves.

U.S. Pat. No. 2,882,244 to Milton discloses the preparation of type X zeolite by a process, wherein it is suggested that the mother liquor may be reused after enrichment with proper amounts of reactants to give a properly proportioned reaction mixture.

U.S. Pat. Nos. 3,574,538 and 3,808,326 to McDaniel, U.S. Pat. No. 3,671,191 to Maher et al and U.S. Pat. No. 3,789,107 to Elliott disclose methods for preparing zeolites wherein zeolite nucleation centers are combined and reacted with sources of silica, alumina, sodium hydroxide and water.

U.S. Pat. No. 3,639,099 granted to Elliott, refers to a process for preparation of Y type zeolite from sodium aluminate and sodium silicate and effective utilization of raw materials. In this invention unreacted silica has been precipitated with a mineral acid and reused as a source of silica for further synthesis of molecular sieves.

U.S. Pat. No. 3,898,319 granted to Weber discloses a method for utilizing waste liquor obtained during synthesis of type Y zeolite, wherein the excess silicate present in the mother liquor is recovered as solid amorphous silica by precipitation with carbon dioxide. The precipitated silica is then reused to prepare additional type Y zeolite.

U.S. Pat. No. 3,939,246 teaches a process for crystallization of aluminosilicate zeolites of the molecular sieve type either as such or in aggregate combination with clay mineral accomplished by the addition of a flux constituting an alkali metal salt to a kaolin-type clay prior to calcination and caustic aging of said clay.

U.S. Pat. No. 4,016,246 teaches a process for preparing faujasite zeolite employing colloidal silica as a silica source.

U.S. Pat. No. 4,164,551 teaches a process for the preparation of type Y zeolite by reacting silica, alumina, sodium hydroxide and water to produce a slurry of type Y zeolite and excess silicate containing mother liquor. Silicate is recovered from the mother liquor as precipitated silica/alumina hydrogel by the addition of an acid aluminum salt such as aluminum sulfate. The precipitated silica/alumina hydrogel is reused as a source of silica and alumina for preparing zeolite.

U.S. Pat. No. 4,175,059 teaches a process for preparing a synthetic faujasite having a novel platelet-type crystalline shape and silica to alumina ratio above 2.2 by adding potassium ions to a seeded faujasite synthesis slurry and heating to convert to the synthetic faujasite. The use of the novel zeolite form as a catalyst promoter and an adjuvant for strengthening formed zeolite such as beads, balls, pills and extrudates is also disclosed.

U.S. Pat. No. 4,178,352 refers to a process for preparing type Y zeolite using a minimum excess of reactants by a method wherein required sodium hydroxide, silica, alumina and water reactants are combined in multi-stage procedure to obtain a uniform fluid reaction slurry. The procedure permits the efficient commercial production of high quality, type Y zeolite and minimizes the formation of excess silicate containing by-product effluent.

Disposal of considerable quantities of silica, soda and sodium salts present in the mother liquor represents both a considerable economic waste and a substantial pollution control problem. Previous attempts to recycle the excess sodium silicate solution to a type Y zeolite synthesis process have not been particularly successful in that excess water and soda/sodium salts associated with the mother liquor tends to produce inferior or no zeolite product.

U.S. Pat. No. 4,228,137 relates to a process for an improvement in the production of zeolites, particularly, zeolites of the faujasite type, employing clay based seeds derived from natural halloysite.

U.S. Pat. No. 4,235,753 relates to an improved process for the production of mechanically strong shaped crystalline zeolite aluminosilicate bodies from precursor bodies composed of kaolin clay calcined at elevated temperature, the crystallized bodies having essentially the same size and shape as the precursor bodies.

U.S. Pat. No. 4,931,267 refers a faujasite polymorph having a silica to alumina ratio greater than 6, and containing tetrapropyl ammonium and/or tetrabutyl ammonium trapped within the supercages of said structure.

U.S. Pat. No. 5,385,717 refers to the preparation of faujasite type structure from aluminosilicate gel containing a structuring agent ST.

U.S. Pat. No. 6,027,708 relates to a process for the production of fly ash based Zeolite-Y (FAZ-Y).

U.S. Pat. No. 6,284,218 refers to a process for the preparation of large crystallite size, highly crystalline faujasite type zeolite by heating a mixture of sodiumaluminosilicate gel and seed. In this invention, said sodiumaluminosilicate gel was prepared by reacting aluminum sulfate with a mixture of sodium silicate and sodium hydroxide.

U.S. Pat. No. 6,299,854 refers to a method of producing artificial zeolite, wherein heat treatment is performed in an alkali solution on a mixture obtained by adding at least one of cullets of glass waste, diatomaceous earth and aluminum dross to incineration ash of combustible waste.

In all the prior art processes for the preparation of faujasite type zeolite silica has been sourced from one of the raw materials such as sodium silicate, clays, colloidal silica, precipitated silica, gel silica, fumed silica including silicas such as those known by trade names as "santocel", "Cab-o-sil", 'hi-Sil", "QUSO" and "Ludox-AS 40". While alumina has been sourced from aluminum salts such as sodium aluminate, aluminum sulfate, pseudoboehmite alumina, gel alumina, clays etc. Depending upon sources chosen for silica and alumina, required amount of soda in the form of sodium hydroxide has been taken.

It may be seen from the various examples for composition of reaction mixtures used in prior art processes for the synthesis of faujasite type zeolite, that soda has been used in moles ranging 2–14, while silica is used in moles ranging from, 3–50 on the basis of the use of one mole of alumina. Water content ranges from 100–1000 moles.

Similarly, from various examples sited in the prior art processes, composition of faujasite type zeolite has been expressed in moles, on volatile free basis as, 0.9–1.05 $Na_2O$, 1 $Al_2O_3$, 3.5–6 $SiO_2$.

From various published literatures and from the yield pattern and composition for zeolites it can be seen that, alumina being highly active, major portion of this species present in the reaction mixture is consumed in the building of zeolite framework. It may be seen that, core portion of most of the zeolites are rich in alumina, while the surface is alumina deficient.

Further, it may be concluded that, as availability of alumina in the reaction mixture become scarce, zeolite stops growing. At this stage, crystallized product is recovered by filtration. Significant amount of silica and soda still remain in the mother liquor. Further, it may be seen from the composition of zeolites, that utilization of soda in building of zeolite is the least, and thus larger portion of it remains in the mother liquor. Presence of excess soda in the mother liquor, permits only partial recycling for fresh zeolite reaction mixture.

In example IV, of U.S. Pat. No. 3,130,007, composition of starting reaction mixture was, 9 $Na_2O$:$Al_2O_3$:12 $SiO_2$:314 $H_2O$, While, the molar composition of crystallized product is, 0.92 $Na_2O$:$Al_2O_3$:3.29 $SiO_2$:7 $H_2O$.

From the above mentioned molar compositions for reaction mixture and zeolite, by assuming all the alumina present in the former is fully utilized, it can be concluded that, only 0.92 moles out of 9 moles of soda present in the reaction mixture is consumed. Similarly, 3.29 moles out of 12 moles of silica present in the reaction mixture is consumed. Mother liquor having unutilized soda and silica is sent to effluent treatment plant, thus causing economic loss.

Similarly, in example 2 of U.S. Pat. No. 6,284,218, the molar composition of reaction mixture has been worked out as:

3.94 $Na_2O$:2.85 $Na_2SO_4$:$Al_2O_3$:10.92 $SiO_2$:188.89 $H_2O$,

While the composition of zeolite on anhydrous basis is: $Na_2O$:$Al_2O_3$:5.8 $SiO_2$.

With the assumption, all the alumina has been utilized in the reaction, composition of mother liquor on anhydrous basis, after the recovery of zeolite has been worked out as, 2.94 $Na_2O$:2.85 $Na_2SO_4$:5.12 $SiO_2$.

In this case, presence of 2.85 moles of $Na_2SO_4$ in the mother liquor, makes it unfit for even partial recycling. Hence, entire mother liquor has to be sent to effluent treatment plant.

Looking at the valuable amount of silica present in the mother liquor and the same being sent to effluent treatment plant as referred to in this prior art citation, it is thought worth to recycle this material, after eliminating undesired sodium salt and soda.

OBJECTS OF THE INVENTION

The prime object of the present invention is to provide a process for recycling the mother liquor obtained after isolation of molecular sieves.

Another object of the present invention is to provide a method by which excess soda present in the mother liquor obtained after isolation of molecular sieves may be economically and efficiently converted into a sodium salt and eliminated thereby obtaining a sodium silicate alkali solution depleted of sodium salt and enriched in silica which may be partly or wholly reused for preparing a fresh batch of molecular sieve or as such as binder in the process for preparing FCC catalyst.

STATEMENT OF THE INVENTION

Accordingly, the present invention provides an improved process for preparing a sodium silicate alkali solution depleted of sodium salt and enriched in silica from a mother liquor recovered after isolation of molecular sieves. More particularly, the present invention provides a process for recycling mother liquor obtained after the isolation of molecular sieves, for the preparation of fresh molecular sieves or as a binder for producing FCC catalyst.

DETAILED DESCRIPTION OF THE PRESENT INVENTION

Accordingly, the present invention provides a process for the elimination of undesired excess soda and sodium salts from the mother liquor obtained after the isolation of molecular sieves and paves a way for complete recycling of said mother liquor. The sodium silicate alkali solution depleted of sodium salt and enriched in silica thus obtained may be used for preparing a fresh batch of molecular sieves or as such as binder for preparing FCC catalyst.

Broadly, the present invention contemplates a process for the removal of excess soda and sodium salt present in the mother liquor to obtain a sodium silicate alkali solution depleted of sodium salt and enriched in silica, which is utilized for several end uses such as, a source of silica for preparing a fresh batch of sodium alumino silicate molecular sieves, as a binder for preparing FCC catalysts and as an ideal composition for the preparation of high silica zeolites such as ZSM-5, mordenite, zeolite beta, ZSM-11 etc.

According to the present invention, soda present in the mother liquor obtained after crystallization of sodium aluminosilcate molecular sieves, is divided in to two types viz., sodium hydroxide and sodium sulfate. If mother liquor contains substantial amount of sodium sulfate i.e. over one mole, the same may be partly crystallized by cooling the mother liquor to a temperature between 5 to 25° C. and the crystallized sodium sulfate is recovered by filtration or any other suitable process.

For mother liquor containing soda in the form of only sodium hydroxide, the quantity of sodium hydroxide present in the mother liquor should be first decreased using a dilute acid. Part of the Sodium hydroxide may be neutralized with a dilute mineral acid, till the final pH value of the acid-mother liquor is in the range of 9 to 12.5 and more preferably when the pH value is 9.5. By subjecting the mother liquor solution to a low temperature typically in the range of 5 to 25° C., major quantity of sodium salt formed during neutralization will be crystallized and recovered. This results in enrichment of silica and reduction in the quantity of undesired soda and sodium salt in the mother liquor. The mineral acid may be selected from sulfuric acid, hydrochloric acid, nitric acid and ortho phosphoric acid for partly neutralizing the soda. Accordingly, with different acids, their respective salts such as sodium sulfate, sodium chloride, sodium phosphate and sodium nitrate may be obtained and the same can be crystallized by cooling and removed by filtration. A mixture of mineral acids may also be used for neutralization of the soda. If a mixture of mineral acids is used, mixed salts will be obtained.

The new found process is not only useful for effective recycling of the mother liquor but also, the sodium salts thus obtained after filtration can be used as a raw material for other processes or can be directly sold.

The present invention can also be employed for effective recycling of mother liquor obtained after isolation of other zeolites such as X, A, ZSM-5, ZSM-11, Beta, mordenite to name a few zeolites.

The invention is further explained with the help of the following examples which are given by way of illustration and should not be construed to limit the scope of the invention.

EXAMPLE 1

Preparing Seed Solution

The example illustrates the process of preparing Seed solution which acts as nucleation centers. 118 gms of sodium silicate (16.4% $Na_2O$, 35.60% $SiO_2$, 48.0% $H_2O$) was diluted with 110 gms of demineralised (DM) water. To this, a solution containing 11 gms sodium aluminate (24.23% $Na_2O$, 43.93% $Al_2O_3$, 31.84% $H_2O$) dissolved in 88 gms of DM water and 28.14 gms sodium hydroxide (77.5% $Na_2O$, 22.5% $H_2O$) were added drop wise with stirring. Stirring continued for 5 minutes. The mixture was aged for 18 hours at 35° C. At the end the slurry was ready for use as a seed solution.

EXAMPLE 2

Preparing Faujasite Type Zeolite

The present example illustrates the process of preparing faujasite type zeolite as per U.S. Pat. No. 6,284,218. 1590 gms of sodium silicate (16.4% $Na_2O$, 35.60% $SiO_2$, 48.0% $H_2O$) was diluted with 400 gms of DM water. To this, sodium hydroxide solution prepared by dissolving 112 gms sodium hydroxide pellets (77.5% $Na_2O$, 22.5% $H_2O$) in 350 gms of DM water was added under stirring. A solution containing 555 gms hydrated aluminum sulfate [$Al_2(SO_4)_3$, 16 $H_2O$ (16.17% $Al_2O_3$)] dissolved in 1100 gms of DM water was added drop wise to the sodium silicate-alkali solution with constant stirring. To this mixture, the seed solution as prepared in Example 1 was added slowly with stirring. The mixture was held at 103° C. for 23 hours in a crystallizer. Crystallized product was filtered out while, mother liquor was stored. The product was washed with boiling DM water till the pH of the filtrate came down to 9, and then dried at 110° C. for 16 hours. 515 gm of oven dried product was obtained having 12 wt % moisture.

The crystallinity of the product was 103%, surface area 759 m²/g, crystallite size 1791 Å, unit cell size (UCS) 24.67 Å, particle size 0.4–0.8 microns and silica to alumina ratio 5.8. Mother liquor was weighed out as 2040 gm which contained 8.42 wt % $Na_2O$, 14.68 wt % $SiO_2$, 0.20 wt % $Al_2O_3$ and 18.42 wt % $Na_2SO_4$.

EXAMPLE 3

Process of Crystallizing Undesired Sodium Sulfate

The example illustrates the procedure for crystallization of undesired sodium sulfate from the mother liquor obtained in Example 2. 2040 gms of mother liquor obtained under Example 2 was transferred to an open plastic vessel and cooled to 6° C. for 12 hours. During this cooling, extra sodium sulfate over saturation point crystallized in to a transparent crystalline product. This crystalline product was recovered by filtration. This product is weighed as 397.9 grams and characterized by X-ray powder diffraction. Sodium silicate alkali solution depleted of sodium salt and enriched in silica obtained after recovery of sodium sulfate crystals is weighed as 1642 grams and analyzed for chemical composition.

X-ray results of dried product matches with the JCPDS file 360397, data for pure $Na_2SO_4$ and is shown in Table-1. Hydrated crystals of sodium sulfate have composition $Na_2SO_4 \cdot 10H_2O$.

TABLE 1

Data for Pure $Na_2SO_4$

| 2 theta value (degree) | "d" Å (interplanar spacing) | Relative Intensity ($I/I_o$ × 100) |
| --- | --- | --- |
| 19.03 | 4.659 | 71 |
| 23.15 | 3.839 | 16 |
| 28.04 | 3.179 | 49 |
| 29 | 3.076 | 42 |
| 32.13 | 2.783 | 100 |
| 33.86 | 2.645 | 53 |
| 38.62 | 2.329 | 25 |
| 40.78 | 2.21 | 5 |
| 47.3 | 1.92 | 3 |
| 48.02 | 1.893 | 4 |
| 48.78 | 1.865 | 34 |
| 49.46 | 1.841 | 6 |
| 50.67 | 1.8 | 6 |
| 54.55 | 1.68 | 15 |
| 55.2 | 1.662 | 10 |
| 57.34 | 1.605 | 5 |
| 57.94 | 1.59 | 3 |
| 59.46 | 1.553 | 13 |

Sodium silicate alkali solution depleted of sodium salt and enriched in silica obtained after recovering $Na_2SO_4$ crystals, was analyzed for composition. Said solution contained 10.46 wt % $Na_2O$, 18.24 wt % $SiO_2$, 12.2 wt % $Na_2SO_4$, 0.25 wt % $Al_2O_3$ and the balance being water.

EXAMPLE 4

Synthesis of Fresh Faujasite from Sodium Silicate Alkali Solution Depleted of Sodium Salt and Enriched in Silica The present example shows how to use the sodium silicate alkali solution depleted of sodium salt and enriched in silica of example 3 for synthesis of fresh faujasite type zeolite by topping up with fresh raw materials.

1640 gms of sodium silicate alkali solution depleted of sodium salt and enriched in silica obtained after removal of $Na_2SO_4$ as mentioned above in example 3 was homogenized with 867 gms of sodium silicate and kept under stirring. 33.95 gms of sodium hydroxide pellets were dissolved in 200 gms DM water and added to sodium silicate-mother liquor solution. 533 gms of aluminum sulfate crystals were dissolved in 900 gms of DM water and added under vigorous stirring to the topped sodium silicate-sodium hydroxide solution to form a gel. 356 gms of seed solution as prepared under example 1 was added to the gel under stirring. Final seed-gel mixture was subjected to crystallization at 103° C. for 23 hours in a crystallizer. At the end, crystallized product was recovered and washed repeatedly with hot DM water, oven dried and characterized. Product was found to have X-ray crystallinity of 95%, with unit cell size 24.67 Å. Surface area of the product was measured as 690 $m^2$/gm.

EXAMPLE 5

Removal of Soda from the Mother Liquor

The present example refers to the process for the removal of excess soda present in mother liquor obtained after crystallization of NaY zeolite prepared from starting gel composition as per example 4 of U.S. Pat. No. 3,130,007 with a difference, seed solution was added for shortening of crystallization time.

Reaction mixture having molar composition, $9Na_2O:Al_2O_3:12SiO_2:314H_2O$, was prepared employing sodium aluminate, sodium silicate and sodium hydroxides along with 5 wt % of seed solution, prepared as per example 1 of the present invention. Crystallization was carried out for 24 hours at 100° C. At the end, crystallized product was filtered out, washed and dried in air oven. Crystalline material was found to be NaY zeolite with crystallinity of 95%.

Mother liquor was weighed as 6144 gms with composition, 8.15 wt % $Na_2O$, 0.03 wt % $Al_2O_3$, 8.5 wt % $SiO_2$ and 83.7 wt % water.

To this mother liquor, 588 gms of 50% sulfuric acid was added under vigorous stirring with a final pH 11.0. This solution was cooled to room temperature and kept at 9° C. for 12 hours. At the end solid hydrated crystals were recovered and weighed as 482 gms. This product was dried and analyzed by XRD. The XRD pattern was found to be similar to that found to be similar to JCPDS file 360397 for $Na_2SO_4$.

Sodium silicate alkali solution depleted of sodium salt and enriched in silica left after recovery of $Na_2SO_4$ is suitable for preparing fresh NaY zeolite batch with top up.

EXAMPLE 6

Use of Sodium Silicate Alkali Solution Depleted of Sodium Salt and Enriched in Silica as Binder for Preparing FCC Catalyst The present example illustrates a procedure for the use of sodium silicate alkali solution depleted of sodium salt and enriched in silica obtained in Example 3 as a binder for preparing FCC catalyst.

400 gms of 30% sulfuric acid was kept under stirring. To this acid solution, 211.76 gms of kaolin clay was added under stirring. This was followed by addition of 658 gms of sodium silicate alkali solution depleted of sodium salt and enriched in silica (having the composition 10.46 wt % $Na_2O$, 12.2 wt % $Na_2SO_4$, 18.24 wt % $SiO_2$ and 58.8 wt % $H_2O$) obtained by example 3 of the present invention. This resulted in the formation of fine clay-silica sol having pH 2.5. Fine slurry of NaY zeolite was prepared by milling 131.6 gms of oven dried zeolite (loss on ignition, 24 wt %) with equivalent weight of DM water. pH of zeolite slurry was brought down to 4.0 using 10 wt % $H_2SO_4$ solution. This milled and pH adjusted NaY zeolite slurry was added to the already prepared silica-clay sol under vigorous stirring. Finally, slurry with a pH of 2.95 and having composition 30 wt % silica, 45 wt % clay and 25 wt % NaY (on anhydrous basis) was spray dried to obtain microspheres.

Spray dried product was washed twice with hot DM water and subsequently exchanged with 5 wt % ammonium sulfate solution at 85° C., for 30 minutes. Ammonium exchanged product was separated by filtration. Ammonium sulfate exchange step was repeated two more times using a fresh solution of ammonium sulphate each time.

Finally, ammonium exchanged catalyst was contacted with a rare earth chloride solution at 65° C. for loading with 2 wt % rare earth oxide. Rare earth exchanged catalyst was washed with water and dried. Dried catalyst was steam deactivated at temperature 788° C. for 3 hours under 100% steam and evaluated by micro activity test (MAT) for its performance. The properties of the feed used for evaluation are shown in Table 2 while the results of the micro activity test are shown in table 3.

TABLE 2

Properties of feed sample used for MAT performance of steam deactivated catalyst under example-6 and a commercial catalyst.

| Wt % | BP ° C. |
|---|---|
| IBP | 315 |
| 5 | 327 |
| 10 | 334 |
| 20 | 346 |
| 30 | 356 |
| 40 | 365 |
| 50 | 375 |
| 60 | 386 |
| 70 | 399 |
| 80 | 415 |
| 90 | 440 |
| 95 | 463 |
| FBP | 528 |
| Pour Point, ° C. | 36 |
| Density at 15° C., g/ml | 0.8677 |
| CCR, wt % | 0.008 |
| RCR, wt % | 0.04 |

TABLE 3

Performance of FCC catalyst prepared as per example 5 compared with a commercial catalyst.

| Component, wt % | Commercial catalyst | Catalyst of example 5 |
|---|---|---|
| 216 - conversion | 67.3 | 69.8 |
| Hydrogen | 0.04 | 0.02 |
| Dry gas | 0.5 | 0.76 |
| LPG | 18.5 | 19.75 |
| Gasoline | 34.5 | 34.85 |
| TCO | 37.6 | 36.78 |
| Bottom, 370+ | 6.9 | 5.68 |
| Coke | 2.1 | 2.16 |

What claimed is:

1. A process for preparing a sodium silicate alkali solution depleted of sodium salt and enriched in silica from a mother liquor obtained after isolation of molecular sieves and suitably recycled further for preparing fresh sodium alumino silicate molecular sieves or as a binder for preparing Fluid Catalytic Cracking (FCC) catalyst, said process comprising steps of:
   a. recovering the mother liquor left after isolation of molecular sieves in a crystallizer;
   b. optionally adding to said mother liquor of step (a), a mineral acid in the range of 1–75% moles equivalent of $Na_2O$ moles present in the mother liquor with stirring;
   c. effecting crystallization of sodium salt by cooling the mother liquor of step (b) to a temperature ranging from 5 to 25° C. for a period ranging from 30 minutes to 48 hours, and
   d. filtering the crystalline sodium salt to yield the sodium silicate alkali solution depleted of sodium salt and enriched in silica.

2. A process as claimed in claim 1, wherein the mother liquor of step (a) is obtained after recovery of molecular sieves selected from the group consisting of zeolite A, zeolite X, zeolite Y, Mordenite, Beta, Omega. ZSM-5 and ZSM-11.

3. A process as claimed in claim 1, wherein the mother liquor of step (a) has the composition in the molar ratio of: $0.5-9$ $Na_2O:0-5$ $Na_2SO_4:0.001-0.05$ $Al_2O_3:2-20 SiO_2:50-1000$ $H_2O$.

4. A process as claimed in claim 1, wherein in step (b), the mineral acid is added to the mother liquor for the conversion of $Na_2O$ to its sodium salt.

5. A process as claimed in claim 4, wherein the mineral acid is selected from the group consisting of sulfuric acid, orthophosphoric acid, hydrochloric acid and nitric acid.

6. A process as claimed in claim 1, wherein in step (b) the pH of the mother liquor after treatment with mineral acid is in the range 9.0–12.5.

7. A process as claimed in claim 1, wherein in step (d) the sodium salt is a pure salt selected from the group consisting of sodium sulfate, sodium chloride, sodium phosphate, sodium nitrate, and mixtures thereof.

8. A process as claimed in claim 1, wherein the sodium silicate alkali solution depleted of sodium salt and enriched in silica has the composition in the molar ratio of: $0.5-7$ $Na_2O:0-2.5$ $Na_2SO_4:0.001-0.05$ $Al_2O_3:2-20$ $SiO_2:50-1000$ $H_2O$.

9. A process as claimed in claim 1, wherein to prepare fresh sodium alumino silicate molecular sieves, the sodium silicate alkali solution depleted of sodium salt and enriched in silica of step (d) is topped with a suitable source of silica, soda and alumina to obtain a reaction mixture which is suitable for preparing fresh sodium alumino silicate molecular sieve.

10. A process as claimed in claim 9, wherein molar ratio of the composition of the topped sodium silicate alkali solution is:
$0.5-9$ $Na_2O:1-5$ $Na_2SO_4:1$ $Al_2O_3:2-20$ $SiO_2:50-1000$ $H_2O$.

11. A process for preparing FCC catalyst using the sodium silicate alkali solution depleted of sodium salt and enriched in silica prepared by the process of claim 1, said process comprising:
   (a) adding clay to dilute mineral acid followed by addition of sodium silicate alkali solution enriched in silica with stirring to form a clay-silica sol having a pH of about 2.5;
   (b) adding a fine slurry of zeolite having pH 4.0 to the silica-clay sol of step (a) with vigorous stirring and adjusting the pH to about 2.5–3.1 to obtain a silica-clay-zeolite slurry having 20–35 wt % silica, 30–60 wt % clay and 15–40 wt % zeolite;
   (c) spray drying the slurry of step (b) to obtain microspheres;
   (d) washing the microspheres of step (c) with hot demineralized water and exchanging using an ammonium salt solution in the temperature range of 80–95° C. to obtain ammonium exchanged catalyst having residual soda less than 0.40 wt %;
   (e) contacting the ammonium exchanged catalyst of step (d) with a rare earth metal chloride solution in the temperature range of 60–80° C. to obtain rare earth loaded catalyst having 1–2.5 wt % of rare earth oxide, and
   (f) washing the rare earth loaded catalyst of step (e) with DM water to remove free chloride ions and drying the same to obtain the FCC catalyst.

12. A process as claimed in claim 11, wherein in step (a) the dilute mineral acid is sulfuric acid.

13. A process as claimed in claim 11, wherein in step (b) the zeolite slurry is prepared by mixing and milling the zeolites selected from the group consisting of zeolite A, zeolite X, zeolite Y, Mordenite, Beta, Omega, ZSM-5 and ZSM-11 with suitable quantity of DM water and 10% aqueous sulphuric acid.

14. A process as claimed in claim 10, wherein in step (d) the ammonium salt solution used is selected from the group consisting of ammonium sulfate, ammonium chloride and ammonium nitrate.

15. A process as claimed in claim 10, wherein in step (e), the rare earth metal chloride solution is selected from chlorides of lanthanide series either alone or in combination.

* * * * *